Jan. 26, 1954      T. O. PALMER      2,666,936
DOCK PLATE
Filed April 29, 1949
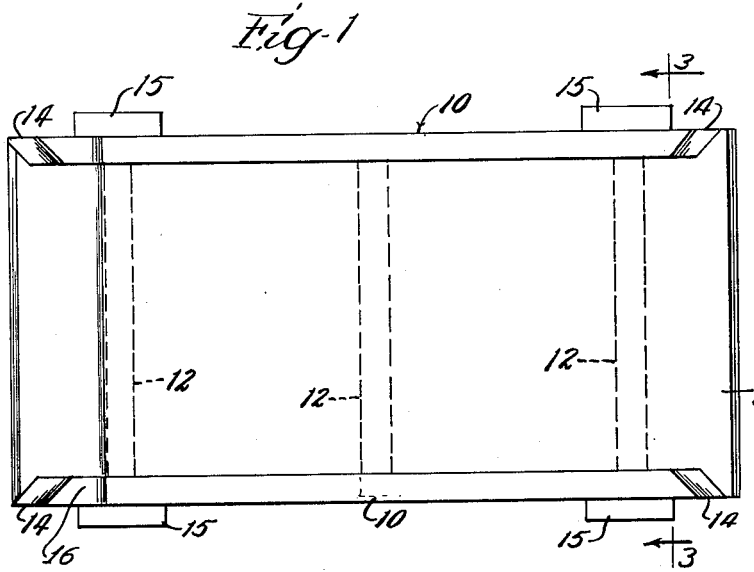
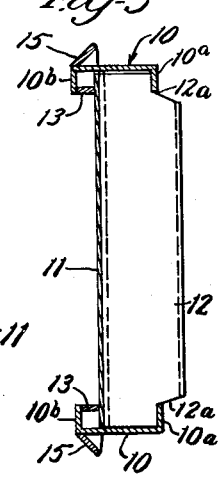
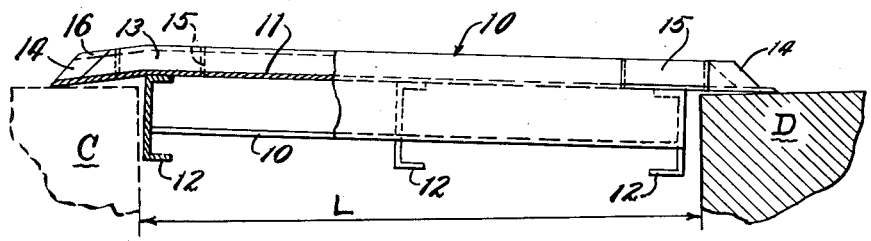
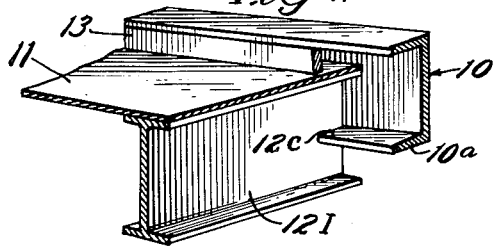
Inventor
Thomas O. Palmer
By:-
Charles K. Woodin
agent Patented Jan. 26, 1954

2,666,936

UNITED STATES PATENT OFFICE 2,666,936

DOCK PLATE

Thomas O. Palmer, Chicago, Ill.

Application April 29, 1949, Serial No. 90,475

4 Claims. (Cl. 14—72)

This invention relates to dock plates or the plates usually found on freight docks for bridging the gaps usually found in truckways between the dock and cars or trucks for loading and unloading freight from the dock to cars and vice versa.

Old boiler plate and other improvisions have commonly been used with indifferent success and at a high cost of labor and time. Material handling in recent years has been given greatly increased attention resulting in a larger increased use of power trucks with much heavier loads. Fire and explosion hazards in handling have also received careful attention.

It is the particular object of the present invention to provide an improved dock plate of lighter weight and increased strength, in which the longitudinal beams and transverse beams are mechanically combined in such a manner that the transverse beams are suspended from the longitudinal beams in addition to the welds which secure the same.

A further object is to provide a dock plate of the above characteristics and having sufficiently low clearance to permit low hung power trucks to use the dock plates without clearance interference.

A still further object is to provide side rails with entry and exit areas that will guide the trucks effectively over the dock plate.

And the general object is to provide a dock plate of greater utility and lower operating cost.

Other benefits and objects will be disclosed in the following descriptions and drawings in which:

Fig. 1 is a plan view of the dock plate of the present invention;

Fig. 2 is a side elevational view of the dock plate shown in Fig. 1 and illustrated as used between a dock and car with parts thereof broken away and in section;

Fig. 3 is a transverse cross sectional view of the dock plate as it would appear along the section line 3—3 of Fig. 1; and Fig. 4 shows a fragmentary perspective view of a portion of a dock plate illustrating a modified construction of the supported beam connections.

In referring now to the drawing, especially to Figs. 1 to 3, there is shown a dock plate comprising side or longitudinal beams 10 which are preferably of channel shape, but which may be of other structural shapes. Transverse beams 12 which are also preferably of channel shape but which also may be of other forms are combined with the longitudinal channels 10 for supporting the floor plate 11. The transverse beams 12 may be suspended from the longitudinal beams in the manner shown in Fig. 3 or in the manner shown in Fig. 4.

In referring first to Fig. 3, it will be noted that the cross channels 12 are cut away at their lower ends as indicated at 12a providing reduced ends which rest upon the lower flanges 10a of the side channels 10 which are directed with their flanges face to face in spaced relation at the marginal sides of the dock plate 11. Thus the cross beams 12 are mechanically suspended from the longitudinal beams 10 which extend across the load spanning gap and support the load. To maintain the side and cross beams 12 in place, the reduced ends of the cross beams are welded to the side channels 10. Thus the strength of the dock plate is materially increased over prior structures involving only a weld connection. The welds contribute to establish the predetermined arrangement of the beams and fix the floor in relation thereto. While the welded joints also add to the strength of the beam joints, this invention includes the further advantage of having certain of the beams such as 12 disposed in saddled and transverse relation by resting upon the beams 10 at the flanges 10a while the transverse beams 12 thus support the floor plate in this underslung relation to the side channels 10. In this manner, the welded joints are taken out of tension and the induced load stresses set up by vehicles crossing the dock plates cannot act upon the welded joints with the possibility of weakening the entire structure at these critical locations.

In the instant construction, it will be observed that the top flanges 10b of the side beams 10 extend above the tops of the cross beams 12, and longitudinally extending guide or filler plates 13 are secured to the top flanges 10b and the floor plate 11 the latter being welded to the cross beams. Thus an elevation in the form of a closed box rail is provided upon each side of the dock plate. These box rails serve as guard rails or barriers for truck wheels and also as strengthening means for the dock plate.

Fig. 4 shows a modification of the invention in which the transverse or cross beams are shown as I beams 121 with mortises or cut out portions 12c in the ends of the beam web for receiving the lower flanges 10a of the side beams 10. The flanges 10a of the side beams are adapted to be welded in the cuts to hold the parts in assembled relation; however, it will be evident that the load is supported by the solid webs of the I beams.

The ends of the side beams 10 are cut on an angle toward the floor plate as are the ends of the filler plates 13, the latter being cut shorter, and polygonal plates 14 are welded to said bevels and to the flanges 10b and floor plate 11 to form downwardly and inwardly bevelled heads on the box rails that flank the floor plate to provide approach guides for vehicle wheels. The side beams are provided with handles 15 having triangular ends and extending laterally outwardly of the beams 10 whereby the dock plate may be readily carried. The front or approach end of the dock plate including the floor plate 11 and the side channels 10 is inclined downwardly as indicated at 16. It will be noted that the left hand ends of the channel beams 10 are cut away from the bottom to a point near the top as shown in Fig. 2, for support upon the support C. The end portions of the beams 10 are bent down by providing V cuts in the bottoms of the webs that remain above the cut out portion. The ends of the beams are bent down to close the V cuts and the edges of the V cuts are then welded together. Furthermore, handles 15 add load carrying rigidity to the box sections and the floor plate at the overhang of the deck and at the critical shear points to greatly increase the safe carrying capacity of the dock plate structure.

Such a dock plate is adapted to form a bridge over a gap L as illustrated in Fig. 2. It will be noted that the ends of the side beams are supported upon supports C and D at the ends of the gap L and that the end cross beams 12 depend below the tops of the supports and adjacent thereto and maintain the dock plate against material longitudinal movement under moving loads.

While I have shown my dock plate as of rectangular form, the front end may be widened to provide a wider mouth for the entrance of trucks. It is contemplated that the form may be varied as desired.

I have not described in detail the welding of the various parts as my dock plate is constructed. I merely desire to explain that the entire structure is welded together in a conventional and approved manner.

It will be obvious that my novel hanging bridge structure of the dock plate provides optimum structural strength while limiting the side rails comprising the box sections to a very low height above the floor plate 11. I have discovered that a height of 1⅜ inches will clear all power trucks and permit their sides to be pivoted over and extend in the clear over the side rails while effectively performing the necessary side rail retaining function. The thickness and weight of the various sections are varied in accordance with the service required. The side rails 10 are usually five inch channels and the cross support members 12 may vary from three to five inches either in channels or I beams.

Although I may make my dock plate of steel and other materials, I prefer to use aluminum of stronger grades because it gives optimum results at less cost and weight. Aluminum is also safe from dangerous sparking tendencies which are present in steel structures. Further, aluminum is highly corrosion resistant and long lived. In order to provide proper traction on the aluminum floor plate, I cover the floor 11 of my dock with an adhesive cement having high traction characteristics.

Having thus described my dock plate, I now claim as new:

1. In a dock plate, a pair of spaced and inwardly directed side channels, spaced cross beams supported upon the lower flanges of said side channels and having their end portions welded to said side channels, the upper surfaces of said cross beams being below the upper flanges of said side channels, a dock plate supported upon said cross beams and secured thereto, and filler plates secured between said dock plate and the outer edges of the top flange of each side channel to form box section rails to reinforce said structure.

2. In a dock plate, a pair of spaced girders having upper and lower flanges directed toward each other, spaced cross beams supported upon the lower flanges of said girders and secured thereto by welding, the upper surfaces of said cross beams being below the upper flanges of said side girders, a dock plate supported upon said cross beams, and filler plates secured between said dock plate and the outer edges of said top flanges and forming guard rails said girders and floor plate being downwardly inclined at their approach ends.

3. In a dock plate, a pair of spaced channel girders having their upper and lower flanges directed toward each other, spaced transverse beams having their ends reduced and supported upon the lower flanges of said girders and welded thereto, the upper surfaces of said beams being spaced below the upper flanges of said girders, a floor supported upon said beams defining a sunken roadway and guard plates secured between the floor and the outer edges of said top flanges for forming box-like guard rails for said road way.

4. In a dock plate, a pair of spaced side girders having upper and lower flanges directed toward each other, spaced cross beams having reduced ends supported upon the lower flanges of said side girders and welded thereto, the upper surfaces of said cross beams being below said upper flanges, a dock plate supported upon said cross beams and defining a sunken road way, and filler plates secured between said floor and said upper flanges of said side girders for forming guard rails.

THOMAS O. PALMER.

References Cited in the file of this patent

UNITED STATES PATENTS

| Number | Name | Date |
|---|---|---|
| 1,017,927 | Tesseyman | Feb. 20, 1912 |
| 1,552,585 | Synck | Sept. 8, 1925 |
| 1,565,879 | White | Dec. 15, 1925 |
| 1,735,590 | White | Nov. 12, 1929 |
| 1,778,667 | French | Oct. 14, 1930 |
| 1,922,027 | Carter | Aug. 15, 1933 |
| 2,089,891 | Greulich | Aug. 10, 1937 |
| 2,307,869 | Tench | Jan. 12, 1943 |
| 2,464,442 | De Roo | Mar. 15, 1949 |
| 2,496,445 | Daniels | Feb. 7, 1950 |
| 2,547,956 | McDonald | Apr. 10, 1951 |